United States Patent [19]

Keller

[11] 4,081,680

[45] Mar. 28, 1978

[54] INFRARED RADIATION-BURGLARY DETECTOR

[75] Inventor: Hansjürg Keller, Mannedorf, Switzerland

[73] Assignee: Cerberus AG, Mannedorf, Switzerland

[21] Appl. No.: 738,909

[22] Filed: Nov. 4, 1976

[30] Foreign Application Priority Data

Jun. 21, 1976 Switzerland .......................... 7795/76

[51] Int. Cl.² ........................... G08B 13/18; G01J 1/02
[52] U.S. Cl. ..................................... 250/342; 250/338; 250/353; 350/1.1
[58] Field of Search ............... 250/338, 340, 342, 353; 350/1, 2; 340/258 D

[56] References Cited

U.S. PATENT DOCUMENTS

| Re. 29,082 | 12/1976 | Schwarz | 250/342 X |
| 3,703,718 | 11/1972 | Berman | 250/338 X |
| 3,829,693 | 8/1974 | Schwarz | 250/342 X |
| 3,988,726 | 10/1976 | Reiss et al. | 250/338 X |

Primary Examiner—Archie R. Borchelt
Attorney, Agent, or Firm—Werner W. Kleeman

[57] ABSTRACT

An infrared radiation-burglary detector comprising a number of reflector surfaces which focus the radiation incident from different separate receiving regions upon a common radiation receiver. The reflector surfaces are arranged and aligned such that the intersection locations of the receiving regions, viewed in the radiation direction, are located behind the front of the detector.

24 Claims, 7 Drawing Figures

INFRARED RADIATION-BURGLARY DETECTOR

BACKGROUND OF THE INVENTION

The present invention relates to a new and improved construction of an infrared radiation-burglary detector — also referred to in the art as an infrared intrusion detector — of the type comprising a number of reflector surfaces which focus the radiation arriving from different separate receiving regions upon a common radiation receiver.

With the aid of detectors of this type there is determined the presence of an object, for instance an intruder or a burglar in a protected room or area, by detecting the infrared radiation radiated by such object. The radiation in question can be the inherent radiation of the individual, in a range between $5\mu$ and $20\mu$, preferably between $7\mu$ and $14\mu$. However, instead of such, there also can be provided a source of infrared radiation and then there is evaluated the radiation reflected by the object or the individual. This is associated with the advantage that there also can be employed radiation in the near infrared range above $1\mu$, where most of the optical components, such as lenses and so forth, do not yet exhibit any appreciable infrared absorption. When utilizing the inherent radiation of the individual it is necessary, on the other hand, to carefully select the employed optical components in order to maintain as small as possible the infrared absorption.

The overlapping of the protected room or area by a number of separate viewing fields or receiving regions with intermediately situated dark zones or fields has been found to be particularly advantageous, in order to be able to detect even the slightest movements of an individual who otherwise would not appreciably alter the total radiation. With suitable overlapping of the room, accommodated to the field of application, it is possible to achieve the result that even with slight movements the boundary between a receiving region and a dark zone is exceeded and at the output of the radiation receiver a pulse-like signal or an alternating-current voltage signal appears which can be easily detected by means of a conventional evaluation circuit and utilized for triggering an alarm signal. There have already been proposed different receiving range patterns, for instance the overlapping or subdivision of a room by means of a large number of receiving rays possessing small aperture angle, by receiving strips or circular- or conical-shaped receiving regions.

However, with state-of-the-art arrangements of the aforementioned type the reflector surfaces are arranged such that the different receiving rays or receiving strips intersect in front of or at the front side of the burglary or intrusion detector. This has the advantage that the reflection angle at the individual reflector surfaces can be maintained just slightly smaller than 90°. Thus, even with a relatively poor optically corrected surface there can be obtained good focusing at the radiation receiver and a small aperture angle of the receiving rays or regions. Since such burglary detectors also can be equipped with simple spherical reflectors, attempts have already been made on numerous occasions to utilize such in practice. However, it has been found to be extremely disadvantageous that at the area of the intersecting receiving region, i.e., at the near or close region directly in front of the front side of the detector, the sensitivity is greater by a multiple factor than at the remote region, i.e., at a greater spacing from such front side. Therefore, such devices tend to trigger false alarms when insects or other living organisms are present at their close region. Also, the closure disc which is almost always used with such type devices, and serving to protect or camouflage the device, can result in triggering of a false alarm. This closure disc is generally constructed such that it is only permeable to radiation in the wavelength range of the evaluated radiation, for instance between $7\mu$ and $14\mu$. Radiation of a different wavelength is absorbed and heats the closure disc, which consequently again transmits its infrared self-radiation in the direction of the radiation receiver. In the presence of more pronounced disturbance radiation of other wavelength ranges, it is therefore possible for a false alarm to be triggered. Additionally, for this reason it is not possible to completely utilize the sensitivity of such burglary detectors. Prior art burglary detectors of this type are also associated with the drawback that they are extremely susceptible to triggering false alarms and in many instances possess inadequate sensitivity especially at the remote region.

SUMMARY OF THE INVENTION

Hence, it is a primary object of the present invention to provide a new and improved construction of infrared radiation-burglary detector which is not associated with the aforementioned drawbacks and limitations of the prior art proposals.

Another important object of the present invention aims at overcoming the previously discussed drawbacks and providing a burglary detector which is less susceptible to triggering false alarms and possessing improved sensitivity, yet having a lesser sensitivity increase at the near region.

Now in order to implement these and still further objects of the invention, which will become more readily apparent as the description proceeds, the invention is manifested by the features that the reflector surfaces are arranged and aligned such that the intersection locations of the receiving regions, viewed in the direction of propagation of the radiation, are located behind the front side or face of the detector.

To this end the inclination angle of the reflector surfaces, in comparison to the incident angle at the reflector receiver, must fall within certain angular ranges, as will be discussed more fully hereinafter in this disclosure.

In order to obtain good focusing upon the radiation receiver, notwithstanding the smaller reflection angle at the reflector surfaces in contrast to heretofore known detectors, a further manifestation of the invention contemplates constructing the reflector surfaces externally of the axis of the device as eccentric sections of a paraboloid of revolution. According to a further construction of the invention, possessing the additional advantages of ease in accommodation of the system to predetermined fields of application and easy adjustment, the different reflector surfaces are constructed as parts of the same cylinder surface, which are separated from one another, perpendicular to the cylinder axis, by non-reflecting, preferably displaceable strips.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
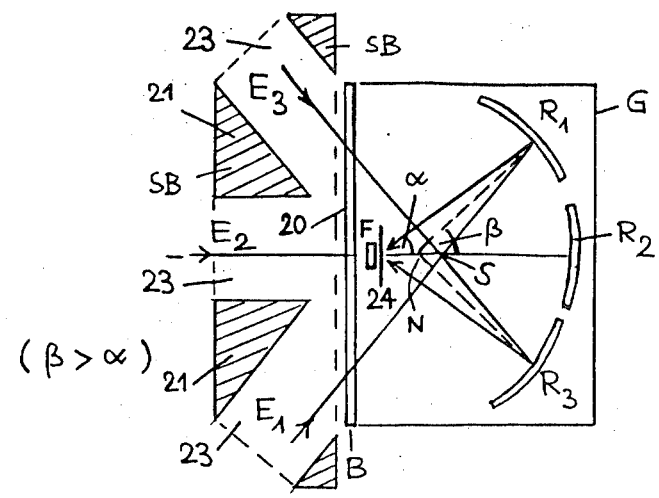
FIG. 1 illustrates a first exemplary embodiment of a reflector arrangement of a burglary or intrusion detector according to the invention.

Referring now to the drawings, the arrangement illustrated in FIG. 1 shows a housing G which is provided at its front side or face 20 with an infrared filter B which is pervious for the wavelength band to be evaluated. Within the housing G there are arranged three reflectors $R_1$, $R_2$, $R_3$ such that radiation arriving from different directions $E_1$, $E_2$, and $E_3$ can be focused in each case by one of the reflectors upon the radiation receiver F arranged at a common focal point. Instead of using only three reflectors it is to be understood that also a larger number of reflectors can be provided, depending upon the desired number of receiving directions. Also, it is possible to dispense with a reflector located along the axis of the device. Furthermore, instead of the illustrated planar arrangement of reflectors, producing a linear arrangement of receiving directions, there also can be selected a spatial arrangement. The alignment of the reflectors $R_1$, $R_2$, $R_3$ also can be carried out such that there is formed a receiving direction-raster or grid, for instance as disclosed in my commonly assigned, copending United States application Ser. No. 738,908, filed Nov. 4, 1976, entitled "Infrared Radiation-Burglary Detector", the disclosure of which is incorporated herein by reference.

In the illustrated embodiment the reflectors $R_1$ and $R_3$ located externally of the center or the lengthwise axis $E_2$ of the device, are inclined towards such lengthwise axis $E_2$ in such a manner that the angle $\beta$ of the primary normal or perpendicular of the reflector surfaces is greater than the angle of incidence $\alpha$ of the radiation striking the receiver F. Consequently, the intersection locations S of the individual receiving directions — viewed in the receiving direction — are all located with respect to one another between the radiation receiver F and the intermediate reflector $R_2$. Consequently, any infrared radiation, which emanates from points directly in front of the closure disc or filter B or from the closure disc itself, is prevented from being reflected by a number of reflectors onto the radiation receiver F. A sensitivity increase at the near region, in comparison to the remote sensitivity, can be thus reduced to that degree which cannot be avoided for other reasons, and there can be extensively prevented any triggering of false alarms by small living organisms located in front of or upon the closure disc or owing to temperature radiation of the disc B itself.

Heating of the closure disc or filter B by the ambient radiation can be still further reduced by means of a diaphragm SB having a solid body 21 formed of a good thermally-conductive material and located in front of the housing G. Body 21 is provided with the opening or bores 23 through which preferably only radiation emanating from the contemplated receiving directions $E_1$, $E_2$ and $E_3$ can enter the detector, whereas radiation coming from other directions is extensively absorbed. A further improvement can be obtained if there is arranged in front of the radiation receiver F a filter disc 24 advantageously possessing the same properties as the filter or closure disc B. In this way the infrared self-radiation of the closure disc B is selectively absorbed by the forwardly arranged filter disc 24.

Figure 2:
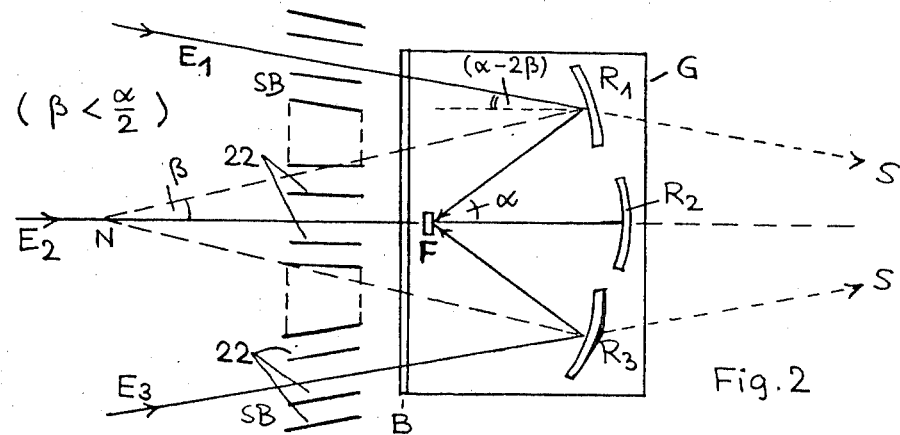
FIG. 2 illustrates a second exemplary embodiment of reflector arrangement of a burglary detector according to the invention.

FIG. 2 illustrates an embodiment wherein the intersecion locations S are shifted rearwardly behind the rear wall of the housing G by appropriately inclining the reflectors $R_1$ and $R_3$. This is realized in that the intersection angle $\beta$ of the respective normal or perpendicular at the reflector surfaces with the lengthwise axis $E_2$ of the device is chosen to be smaller than one-half of the radiation angle of incidence $\alpha$ at the receiver F. What is advantageous for this embodiment, apart from the aforementioned feature, is that the intersection locations S are shifted quite far rearward and the susceptibility to triggering false alarms and the sensitivity can be further reduced. A certain drawback exists, however, in that here the reflection angle must be considerably smaller than 90°, requiring a better optical correction of the reflection surfaces, or there must be tolerated larger aperture angles of the individual receiving regions, which in practice however, in many instances, is desired in any case. With the illustrated embodiment there are provided as a further improvement lamellae-or web-shaped diaphragms SB composed of the lamallae or webs 22.

Figure 3:
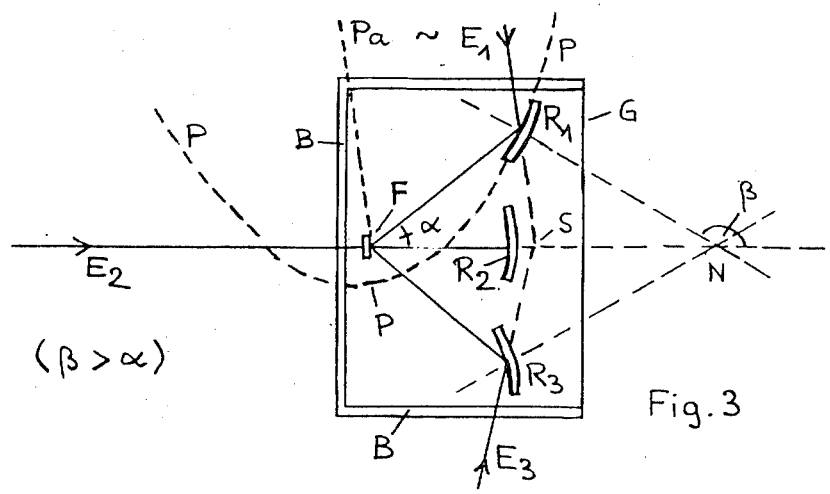
FIG. 3 illustrates a third exemplary embodiment of reflector arrangement of a burglary detector according to the invention.

With the arrangement shown in FIG. 3 the eccentric reflector surfaces $R_1$ and $R_3$ are rearwardly inclined, i.e., the primary or main normal-intersection angle $\beta$ with the device lengthwise axis $E_2$ is greater than 90°. In this case there is always obtained an intersection point S of the receiving directions which is located behind the front of the device. With this embodiment there can be realized receiving directions which overlap an entire halve of a room, so that a thus designed burglary or intrusion detector, due to its panoramic sensitivity, is particularly suitable for use as a ceiling alarm which can be mounted at the center of the room. In this case it is advantageous to also construct the side portions of the housing G as infrared filters B. Since it is not possible to obtain good focusing upon the receiver F from the lateral receiving directions $E_1$ and $E_3$, due to the flat reflection angle when using spherical mirrors, it is advantageous to construct the lateral reflectors $R_1$ and $R_3$ as markedly eccentric sections of a paraboloid of revolution, the rotational axis Pa of which is aligned essentially parallel to the momentary receiving and one-half 1. In this way, there can with heretofore known a considerable improvement and also with lateral radiation incidence a sharper boundary between the receiving regions or the viewing fields and the intermediately situated dark zones or fields than was possible with the heretofore known infrared radiation-burglary detectors employing spherical mirrors.

In summation it can be stated that the characteristic feature, namely that the intersection locations of the individual receiving regions, viewed in the radiation direction, are located behind the front of the detector or behind the radiation receiver usually arranged at this region, is realized in that the inclination angle of the eccentric reflectors or the intersection angle $\beta$ of their primary normal with the device lengthwise axis are chosen such that they lie outside of the region between the incidence angle $\alpha$ at the receiver and one-half of this angle $\alpha/2$. With heretofore known constructions the normal angle $\alpha$ was selected such that it assumed a value between the incidence angle $\alpha$ and one-half of this angle $\alpha/2$, resulting in the intersection point of the receiving directions coming to lie in front of the radiation receiver F.

Figure 4:
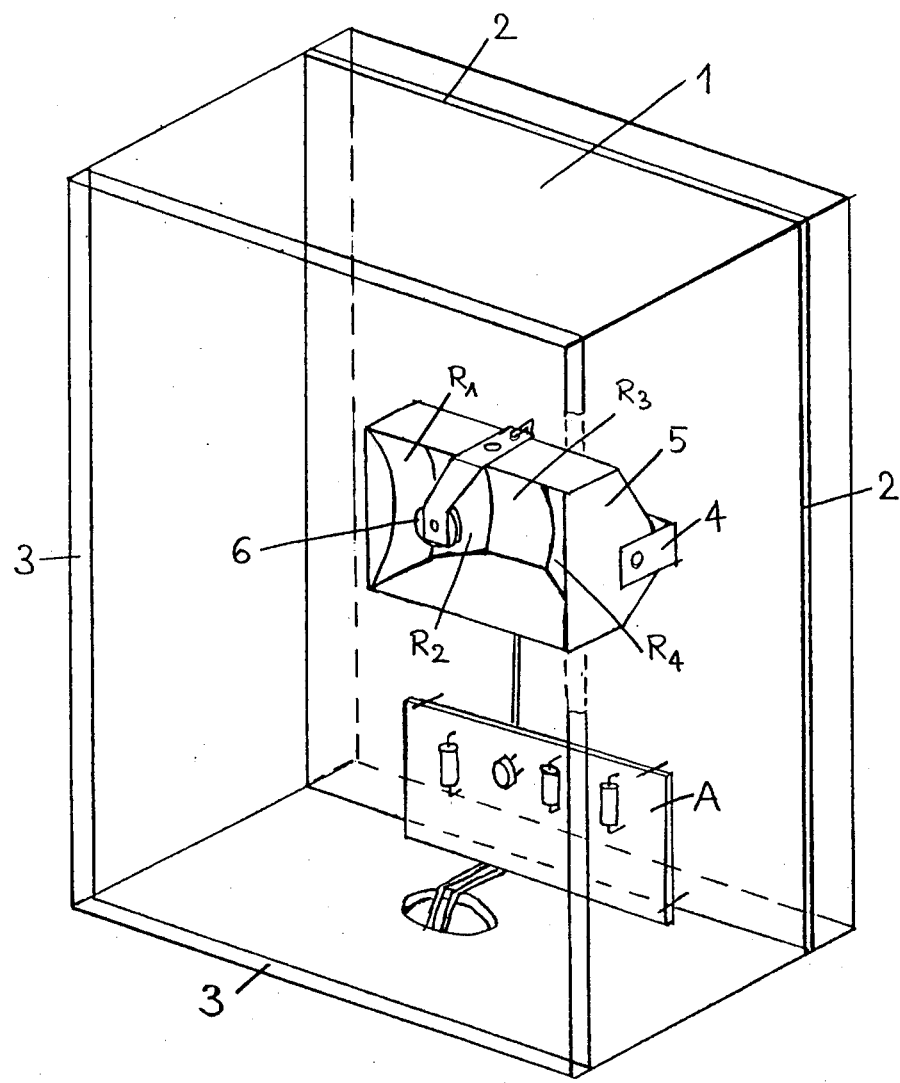
FIGS. 4, 5, and 6 respectively show different exemplary embodiments of burglary detectors equipped with different types of reflectors.

FIG. 4 illustrates a burglary or intrusion detector wherein there is employed a reflector arrangement of the type shown in FIG. 1 or FIG. 2. A substantially vat- or trough-shaped reflector support 5 is rotatably and pivotably arranged by means of a bracket 4 upon a support plate 2 within a housing 1, which is covered at the front side by a filter 3 which is pervious to infrared radiation. The reflector support 5 is arranged such that the device axis can be adjusted in accordance with the fields of application. In the trough-shaped reflector support 5 there are mounted five or more reflector elements $R_1$, $R_2$, $R_3$ etc. Forwardly of the front opening there is secured by means of not particularly referenced attachment bracket the radiation receiver 6 in such a manner that it is located approximately at the focal points of the reflector surfaces. The terminals of the radiation receiver 6 are connected with any conventional evaluation circuit A known to the art and arranged internally of the housing 1 and which circuit, upon a sudden change in the radiation or a rapidly fluctuating irradiation of the radiation receiver 6, triggers an alarm signal.

It is here mentioned that the reflector elements $R_1$, $R_2$ etc. can be constructed as spherical mirrors or paraboloids of revolution, there being formed a number of linear arranged, discrete receiving directions with small aperture angles. In the event there are desired strip-shaped receiving regions, then this is possible by constructing the reflector surfaces as double-curved surfaces having different primary or main radii or curvature, and the radiation receiver is mounted at the focal point of the horizontal section. With such construction there can be obtained vertically arranged, strip-shaped receiving regions having relatively small horizontal aperture angle.

Figure 7:
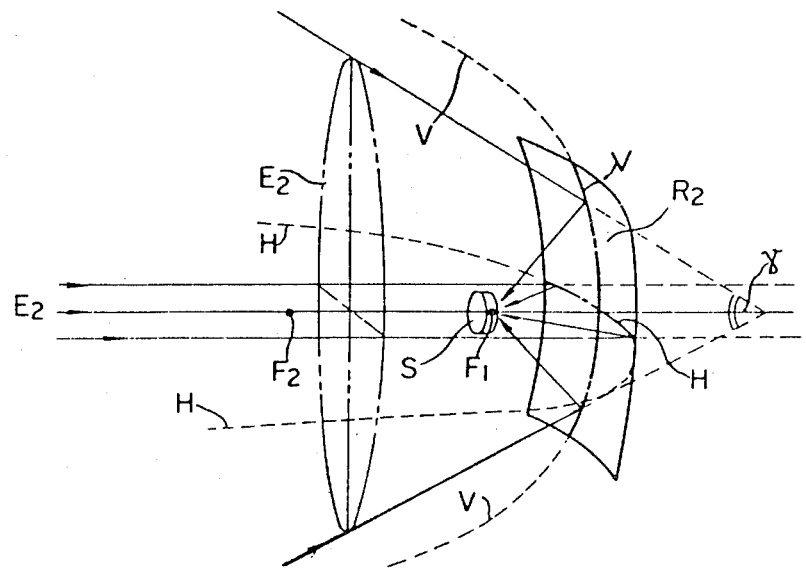
FIG. 7 illustrates a still further construction of a reflector employing a doubly-curved reflector surface.

Such an arrangement has been shown in FIG. 7 wherein the therein depicted reflector surface $R_2$ constitutes an aspherical double-curved surface having two different main radii of curvature and main focal length. The vertical section V and the horizontal section H are each constructed as a parabola or circular arc, and the focal point $E_1$ of the horizontal section H is different than the focal point $F_2$ of the vertical section V. The radiation detector S is arranged approximately at the focal point $F_1$ of the horizontal section H. As a result, the receiving- or viewing field $E_2$ associated with the reflector surface $R_2$ is focused or bundled relatively well horizontally, on the other hand, exhibits a rather large vertical aperture angle $\gamma$.

Figure 5:
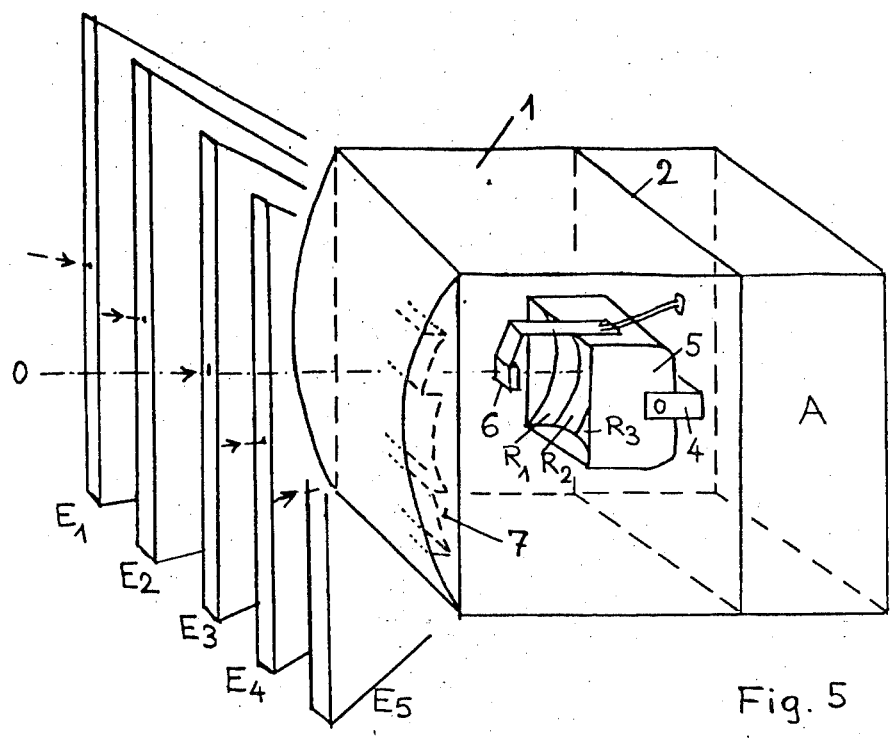

In the case of the radiation detector illustrated in FIG. 5, the components of which correspond to the embodiment of FIG. 4, the spreading of the point-shaped receiving directions into strip-shaped receiving regions $E_1$, $E_2$, $E_3$, $E_4$, and $E_5$ is achieved in that the front side 7 is constructed as a cylindrical lense. There can be used simple spherical reflectors or reflectors formed as paraboloids of revolution and there can be dispensed with the use of complicated and expensive reflectors having different primary radii of curvature. The cylindrical lense 7 also can be constructed as an echelon lense, for instance a Fresnel lense, so that its thickness and infrared absorption can be maintained small. This is particularly required for use in a passive infrared detector for the detection of the self- or inherent radiation of persons at the remote infrared region. In this regard it is advantageous to form the cylindrical lense, instead of from glass, from a suitable infrared permeable plastic.

Figure 6:
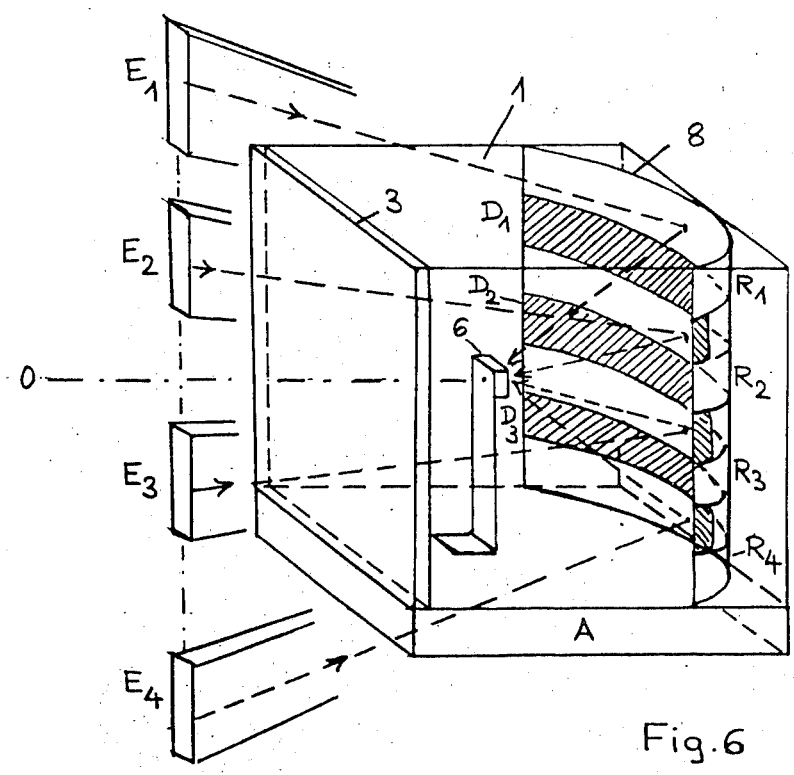

Regarding the burglary detector illustrated in FIG. 6 there are used, instead of spherical or paraboloidshaped reflectors, substantially cylindrical-shaped reflector elements or components $R_1$, $R_2$, $R_3$ and $R_4$ which are separated from one another by radiation-absorbing dark zones $D_1$, $D_2$ and $D_3$. It is particularly advantageous to construct the reflector components as parts of a single cylindrical-shaped reflector 8 at which there are mounted displaceable radiation-absorbing strips $D_1$, $D_2$ and $D_3$ and so forth. These radiation-absorbing strips are, for instance, in the form of blackened metal strips which can be manually displaced into the desired position and then fixed thereat by cementing or the like. The radiation-absorbing strips are further advantageously mounted vertically with respect to the cylinder axis, but also can be arranged to extend at an inclination thereto. The radiation receiver 6 once again is arranged at the focal line of the cylinder 8. There is thus formed a number of receiving regions $E_1$, $E_2$, $E_3$ and $E_4$ which are linearly arranged above one another, exhibit a very small horizontal aperture angle, however a large vertical aperture angle. What is of particular advantage in this case is that by means of the displaceable, radiation-absorbing strips $D_1$, $D_2$ and $D_3$ the receiving regions can be easily and conveniently adjusted and accommodated to the operating conditions. Since in this embodiment the normal angle $\beta = 0$, the intersection locations of the receiving regions also in this case are located behind the reflectors, so that here also the susceptibility to triggering false alarms and the increase of the near sensitivity can be maintained small.

In addition to the described measures the heating of the closure- or filter disc 3 by the ambient radiation and the thus resulting disturbances can be reduced in that the front side of the closure disc or lense is constructed to be selectively reflective, and specifically for as large as possible wavelength range outside of the evaluated band for which the filter must exhibit as good as possible permeability. A further improvement can be realized in that there are mounted diaphragms in front of the front of the housing or the closure- or filter disc 3, which screen or absorb radiation emanating from directions other than the contemplated receiving regions, as already mentioned during the description of FIGS. 1 and 2. These diaphragms can be advantageously constructed to be lamellae- or honeycomb-shaped and/or consist of a good absorbing blackened material having high specific heat and good thermal conductivity, for instance formed of thick-walled or solid, black eloxidized aluminum so that there results a good storage and withdrawal of the incident radiation energy.

While there are shown and described present preferred embodiments of the invention, it is to be distinctly understood that the invention is not limited thereto, but may be otherwise variously embodied and practiced within the scope of the following claims. Accordingly,

What is claimed is:

1. An infrared radiation-burglary detector comprising a common radiation receiver for different receiving regions, a number of reflector surfaces focusing the radiation arriving from the different receiving regions upon the common radiation receiver, said reflector surfaces being arranged and aligned such that any intersection locations of the receiving regions, viewed in the irradiation direction, are located behind the front of the detector, so that there is prevented focusing of radiation upon said common radiation receiver from an object disposed at any location in front of the detector by more than one of said reflector surfaces.

2. The detector as defined in claim 1, wherein given ones of said reflector surfaces are located externally of the lengthwise axis of the detector and aligned such that the angle formed by their main normal with such lengthwise axis lies outside of the angular range between the incident angle of the radiation arriving at the radiation receiver formed with the lengthwise axis and one-half of such angle.

3. The detector as defined in claim 1, wherein each of the reflector surfaces comrpise paraboloids of revolution.

4. The detector as defined in claim 3, wherein at least given ones of the reflector surfaces are located externally of the lengthwise axis of the detector, said externally located reflector surfaces comprising eccentric sections of paraboloids of revolution, the respective axis of which is aligned essentially parallel to the momentary receiving direction.

5. The detector as defined in claim 1, wherein the reflector surfaces each comprise double-curved surfaces possessing different main radii of curvature, the radiation receiver is arranged substantially at the focal point of a main section of the associated individual reflector surfaces.

6. The detector as defined in claim 1, wherein the reflector surfaces each comprise a substantially spherical surface, and a cylindrical lense arranged at the front of the detector.

7. The detector as defined in claim 6, wherein the cylindrical lense comprises an echelon lense.

8. The detector as defined in claim 1, wherein the reflector surfaces each comprise a substantially paraboloid-shaped surface, and a cylindrical lense arranged at the front of the detector.

9. The detector as defined in claim 7, wherein the cylindrical lense comprises an echelon lense.

10. The detector as defined in claim 1, wherein each reflector surface comprises a substantially cylindrical surface.

11. The detector as defined in claim 1, wherein the reflector surfaces comprise portions of a cylinder surface, radiation-absorbing strips mounted at the surface of said cylinder surface, the radiation receiver being arranged at the focal line of the cylinder surface.

12. The detector as defined in claim 11, wherein the radiation-absorbing strips comprise displaceable strips.

13. The detector as defined in claim 1, further including a filter arranged at the front of the detector.

14. The detector as defined in claim 13, wherein said filter is permeable to infrared radiation in a predetermined spectral range.

15. The detector as defined in claim 13, wherein the filter has a front face structured such that radiation of a wavelength falling outside of a predetermined infrared-throughpass range is at least partially reflected.

16. The detector as defined in claim 1, further including diaphragm means having openings and arranged forwardly of the front of the detector and aligned such that the openings thereof only permit passage of radiation emanating from predetermined receiving directions.

17. The detector as defined in claim 16, wherein the diaphragm means contains radiation-absorbing surfaces.

18. The detector as defined in claim 16, wherein the diaphragm means comprise lamellae.

19. The detector as defined in claim 16, wherein the diaphragm means is essentially honeycomb-shaped.

20. The detector as defined in claim 16, wherein the diaphragm means comprise bores provided in a good thermally-conductive solid body member.

21. The detector as defined in claim 13, further including an additional filter with equivalent properties as said filter arranged at the front of the detector, said additional filter being arranged in front of the radiation receiver.

22. The detector as defined in claim 1, wherein the intersection locations of the receiving regions are disposed behind the radiation receiver.

23. The detector as defined in claim 1, wherein the intersection location of the receiving regions are located behind the reflector surfaces.

24. An infrared radiation-burglary detector comprising a common radiation receiver for different receiving regions, a number of reflector surfaces focusing the radiation arriving from the different receiving regions upon the common radiation receiver, said reflector surfaces being arranged and aligned such that all real and virtual intersection locations of the receiving regions, viewed in the irradiation direction are located behind the front of the detector, in order to thereby prevent focusing of radiation upon said common radiation receiver from an object disposed at any location in front of the detector by more than one of said reflector surfaces.

* * * * *